United States Patent [19]
Chonan

[11] Patent Number: 4,620,140
[45] Date of Patent: Oct. 28, 1986

[54] CONTROL DEVICE FOR VARIABLE SPEED ELECTRIC MOTOR

[75] Inventor: Katsuhiko Chonan, Aichi, Japan

[73] Assignee: Mitsubishi Denki Kabushiki Kaisha, Tokyo, Japan

[21] Appl. No.: 732,719

[22] Filed: May 10, 1985

[30] Foreign Application Priority Data
May 11, 1984 [JP] Japan .................................. 59-92923

[51] Int. Cl.[4] .......................... G05F 1/67; G05F 1/625
[52] U.S. Cl. .................................... 318/332; 318/333; 136/291; 136/293; 323/906
[58] Field of Search ........................ 318/332, 333, 480; 323/906; 136/291, 293

[56] References Cited
U.S. PATENT DOCUMENTS
4,580,090 4/1986 Bailey et al. ..................... 323/906 X FOREIGN PATENT DOCUMENTS
2158621 4/1985 United Kingdom ................ 323/906

OTHER PUBLICATIONS
I. C. Franx, "A New Approach to Solar Pump System Using Submersible Motors", Commission of the European Communities, 2nd E.C. Photovoltaic Solar Energy Conference, Berlin, West Germany, 23-26, Apr. 1979, pp. 1038-1046.

Primary Examiner—William M. Shoop, Jr.
Assistant Examiner—Bentsu Ro
Attorney, Agent, or Firm—Bernard, Rothwell & Brown

[57] ABSTRACT

A control device for a variable speed electric motor determines a quantity of light received from a short-circuit current of a solar battery, and also determines a cell temperature of the solar battery from an open circuit voltage, thereby producing a current command signal permitting an optimum load current for an output condition of said solar battery.

4 Claims, 6 Drawing Figures

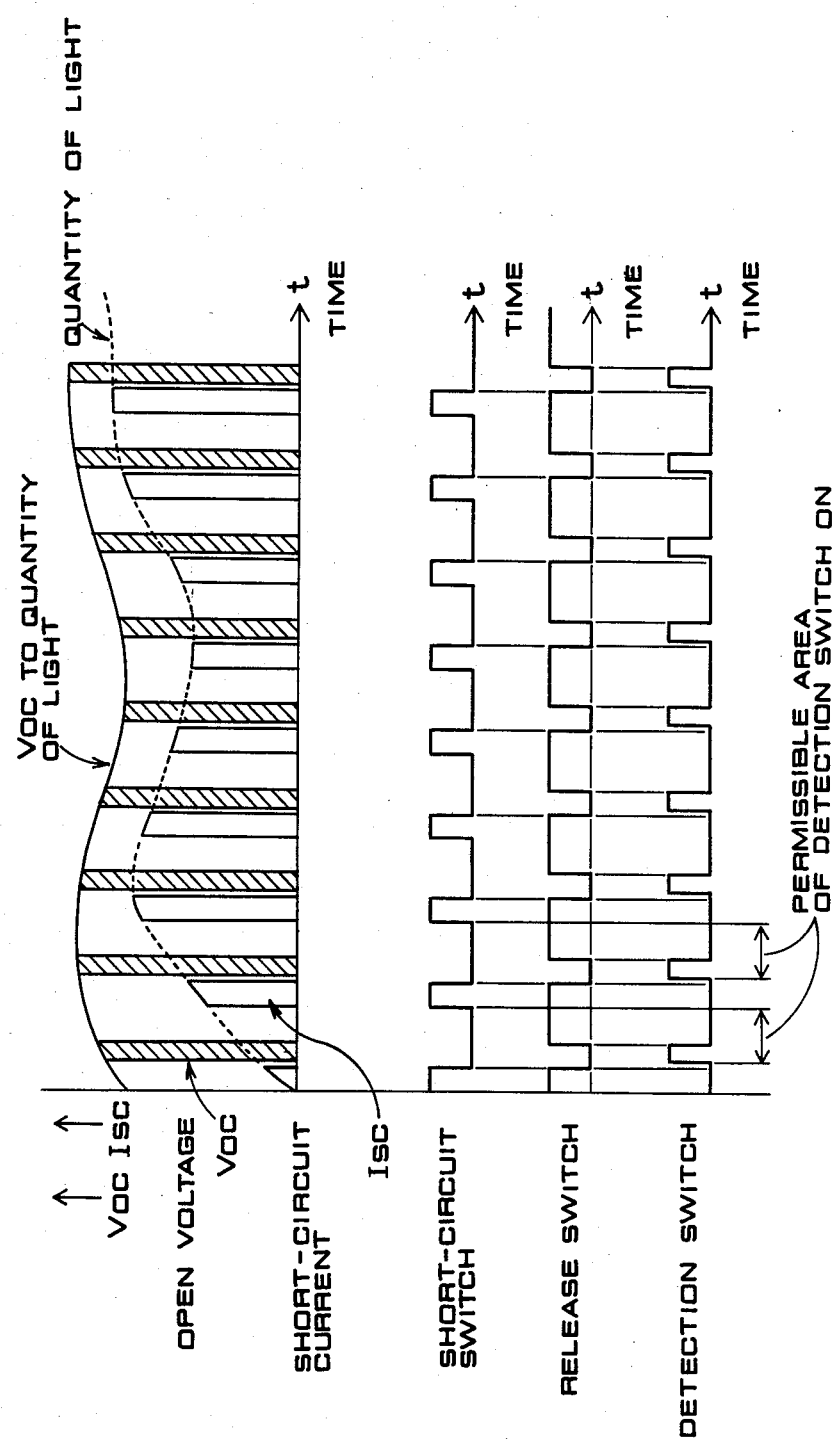

4,620,140

CONTROL DEVICE FOR VARIABLE SPEED ELECTRIC MOTOR

BACKGROUND OF THE INVENTION

1. Field of the Invention

This invention relates to a control device for variable speed electric motor which may be operated with a high efficiency by a solar battery as a drive source.

2. Description of the Prior Art

Recently, a pump to be driven by a solar battery as a power source has been used for irrigation and the like in a desert. A greatest merit of use of the solar battery is that a power distribution and transmission work is rendered easy and that the battery is not costly. Accordingly, if cost of the solar battery is reduced in the future, it is expected that such a pump will be rapidly spread. Constitution of a conventional device using the solar battery will be described below.

A conventional control device for such kind of variable speed electric motor is shown in FIG. 1, in which reference numeral 1 designates a variable speed electric motor (which will be hereinafter referred to as an electric motor) such as an irrigation motor (AC motor). A main circuit 2 serves to reversely convert a direct current to an alternating current so as to drive the electric motor 1. A solar battery 3 is constituted of a cell and the like, and generates a supply voltage according to a quantity of sunshine, etc. A control device 4 acts to drive the main circuit 2 so as to operate the electric motor 1 at variable speeds. The control device 4 is driven by a start switch 5 and controls the main circuit 2 at such a speed as set by a speed setting device 6.

In operation of the conventional device as mentioned above, when the start switch 5 is operated to command operation start, the control device 4 acts to on-off control a switching element included in the main circuit 2 according to a set value as set by the speed setting device 6. At this time, a direct current voltage is generated from the solar battery 3 according to a quantity of sunshine and the like, and the direct current is converted to an alternating current by the main circuit 2. If the alternating current voltage is greater than a voltage value permitting the electric motor 1 to be started, the electric motor 1 is started to drive the pump. In this case, the higher the rotational speed of the electric motor becomes, the greater the power becomes to improve an investment efficiency. However, if the pump is driven under full load (at a maximum rotational speed) with the small quantity of light, a voltage of the solar battery 3 is remarkably decreased to cause lack of output or stoppage of the control device 4. Generally, as shown in FIG. 2B, an open circuit voltage Voc of the solar battery 3 is little influenced by a quantity of light under no load, and always shows a high constant voltage value. Therefore, so long as a load is not actually connected to the battery, an output voltage is indefinite. For this reason, the motor is started to operate with a strength of sunshine chosen. However, if the quantity of light is small, the output voltage is widely decreased even by a slight output current.

Owing to the above-mentioned constitution of the conventional control device of the variable speed electric motor, it is difficult to seize the quantity of light before starting the electric motor. Further, if the quantity of light is not sufficient at starting, the output voltage is decreased just after starting, and accordingly a sufficient starting torque may not be provided for the electric motor, causing the electric motor not to be started. Furthermore, even when the quantity of light is changed during driving the electric motor, an output current of the solar battery cannot be controlled so that the output voltage of the solar battery may be maintained at values greater than a fixed value. If the quantity of light is insufficient, the output voltage of the solar battery is widely decreased to disadvantageously cause reduction in efficiency of the solar battery as well as impossibility of drive of the electric motor.

SUMMARY OF THE INVENTION

This invention is intended to eliminate the shortcomings as mentioned above in the prior art, and it is an object of the present invention to provide a control device for a variable speed electric motor which may drive the electric motor with an optimum load current for an output condition of the solar battery, by determining a quantity of light received from a short-circuit current of the solar battery, also determining a cell temperature of the solar battery from an open voltage, and compensating a current command signal according to the quantity of light received.

BRIEF DESCRIPTION OF THE DRAWINGS

FIG. 4 is a waveform chart of an essential part in FIG. 3.

DETAILED DESCRIPTION OF THE PREFERRED EMBODIMENTS

Figure 1:
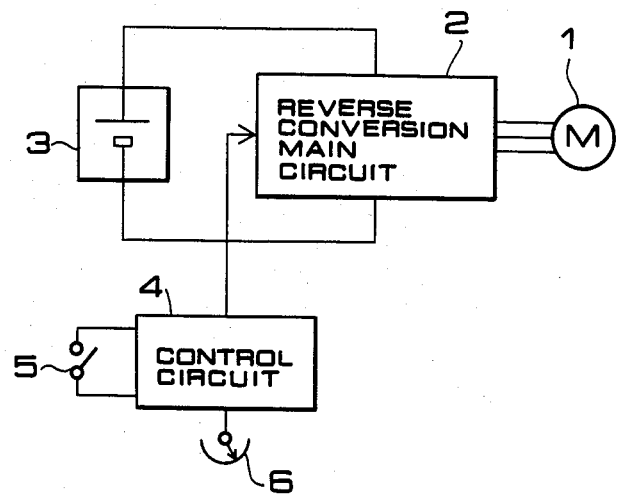
FIG. 1 is a block diagram showing a conventional control device for a variable speed electric motor.
Figure 3:
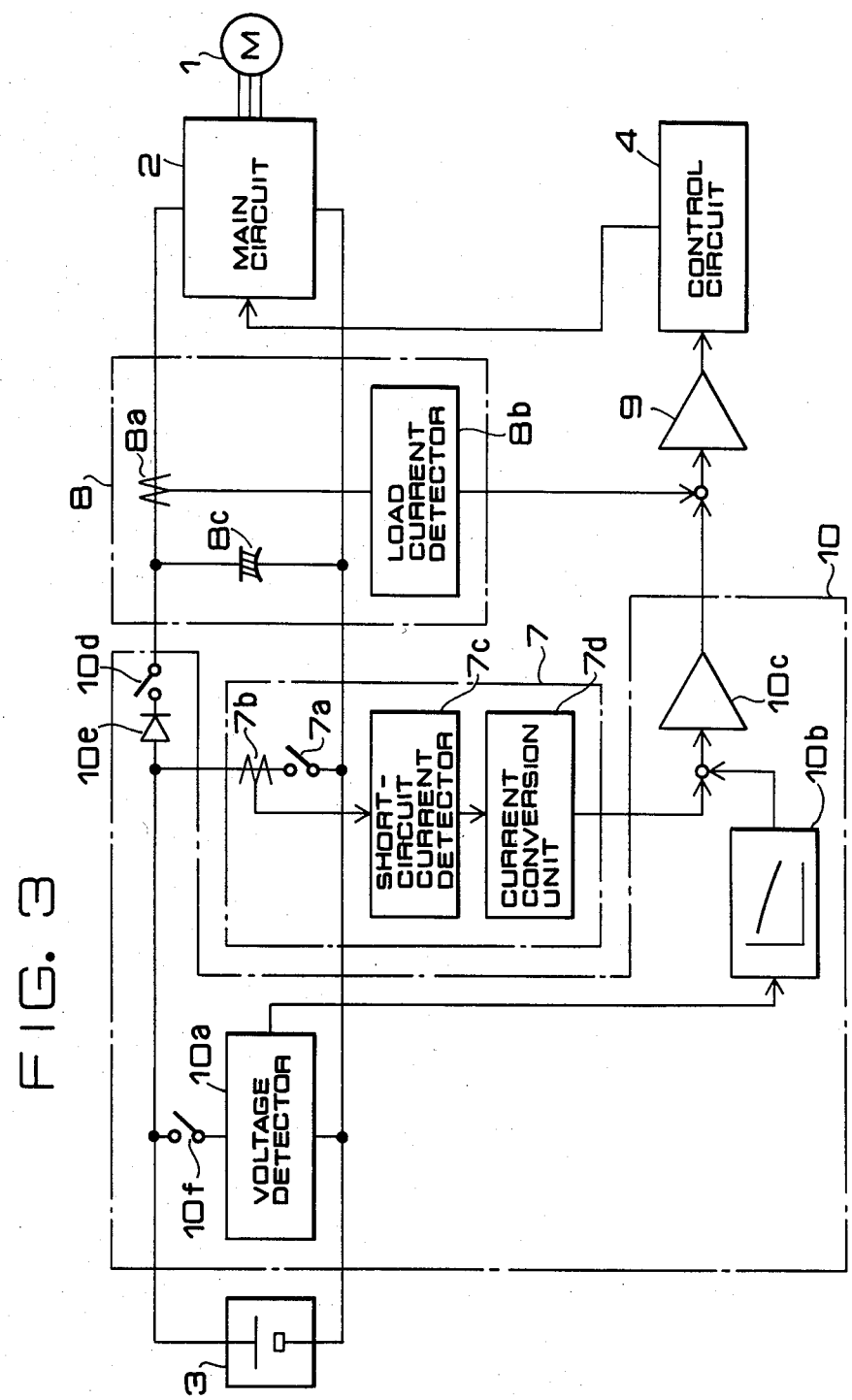
FIG. 3 is a block diagram showing a control device for a variable speed electric motor of a preferred embodiment according to the present invention.

A preferred embodiment of the present invention will be described below with reference to FIG. 3, in which reference numerals 1-3 indicate the same members as those indicated by the same numerals in FIG. 1. Reference numeral 4 designates a control device for receiving a frequency command so as to operate an electric motor 1 and drive a main circuit 2. A short-circuit switch 7a for intermittently short-circuiting a solar battery 3 forms a series circuit in combination with a current transformer 7b. A short-circuit current detector 7c for detecting a short-circuit current from the current transformer 7b upon closing of the short-circuit switch 7a produces a current command signal for operating the electric motor 1 with a maximum power by a subsequent current conversion unit 7d. Thus, a short-circuit current detection unit 7 is constituted of the above-mentioned short-circuit switch 7a, the current transformer 7b, the short-circuit current detector 7c and the current conversion unit 7a. A current transformer 8a forms a load current detection unit 8 for detecting a load current from the solar battery to the main circuit 2 by a load current detector 8b. An operating unit 9 serves to compute and set a rotational speed so that a load current may accord to a current command signal from the short-circuit current detection unit 7, and supplies a frequency command signal to the control circuit 4.

Reference numeral 10 designates a temperature compensation unit consisting of a voltage detector 10a connected in parallel to the solar battery 3 and forming a series circuit in combination with a detection switch 10f, a converter 10b for converting an output from the voltage detector 10a to temperature and producing a compensation signal, a compensator 10c for generating a current command signal as compensated by the compensation signal according to the current command signal from the short-circuit current detection unit 7, an open switch 10d for releasing a load so as to detect an open voltage, and a diode 10e for preventing reverse flow from a load side upon closing of the short-circuit switch 7a.

Figure 2A:
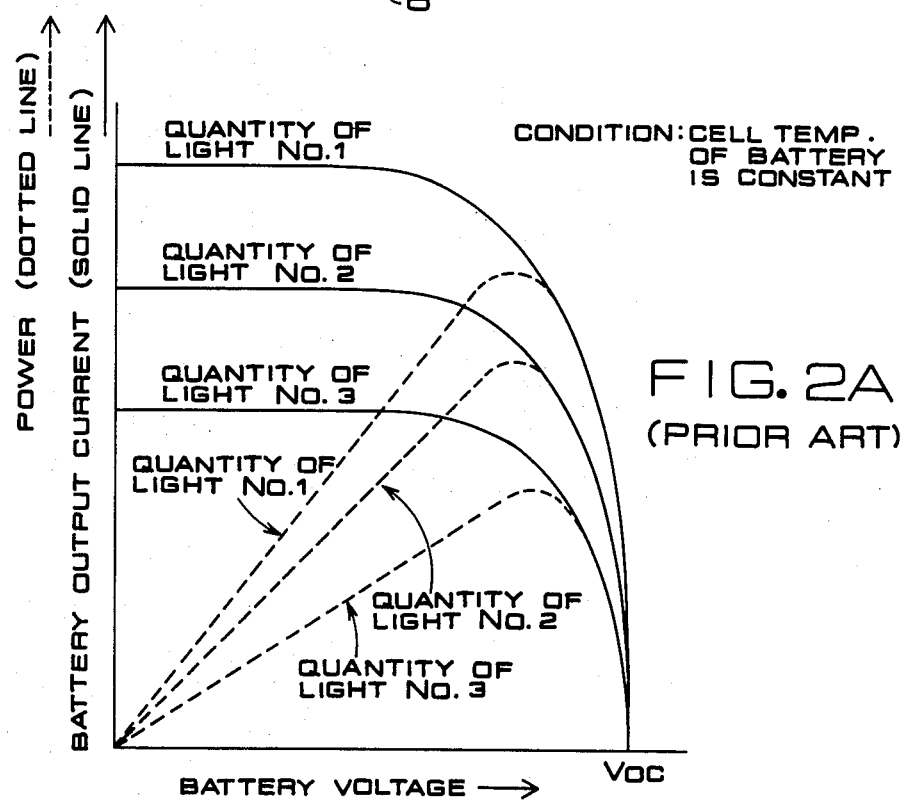
FIG. 2A is a graph showing characteristics of the solar battery in FIG. 1.
Figure 2B:
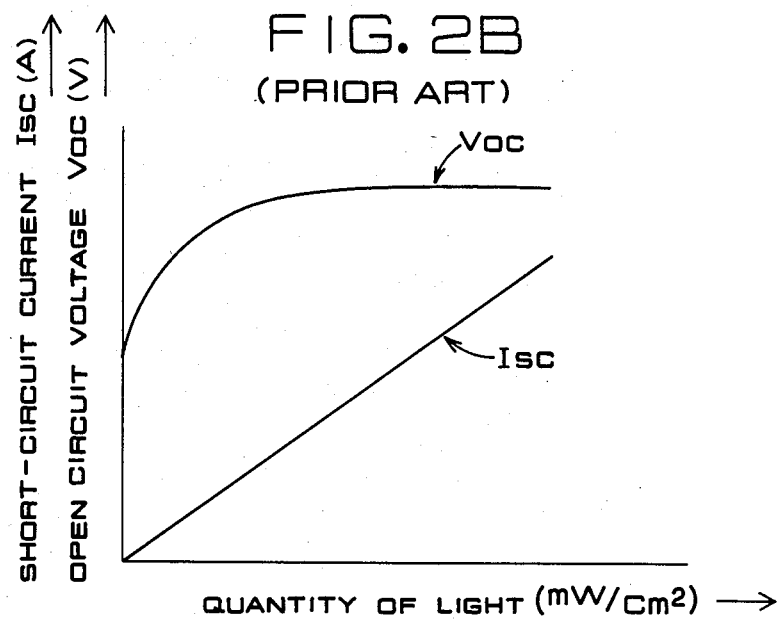
FIG. 2B is a graph showing a relation between a short-circuit of the solar battery in FIG. 1 and a quantity of light.

Prior to description of operation of the preferred embodiment, there will be first described quantity of light-power characteristics of the solar battery 3. The solar battery 3 has such quantity of light-power characteristics as shown in FIG. 2A, and therefore it is necessary to operate a motor at a maximum power point at all times for purpose of highly efficient operation. As shown in FIG. 2B, the characteristics of the solar battery 3 are such that an open circuit voltage Voc is changed by the quantity of light, and therefore the quantity of light-power characteristics are changed by the quantity of light as shown by the quantity of light No. 1, No. 2 and No. 3. For this reason, according to the present invention, the quantity of light-power characteristics are determined according to the quantity of light to be received, and are compensated by cell temperature characteristics thereby to permit a load current to flow so as to effect a maximum power operation and operate the electric motor 1 with a high efficiency.

Further, according to the present invention, the quantity of light to be received is anticipated by the short-circuit current of the solar battery 3. That is to say, as the quantity of light is substantially proportional to the short-circuit current under the condition of constant cell temperature, it is possible to easily anticipate the quantity of light from the short-circuit current. In this connection, as the solar battery 3 has such a property that current neither does freely flow upon short-circuiting nor is the battery damaged, the short-circuit current may be utilized as means for anticipation of the quantity of light to be received.

Figure 2C:
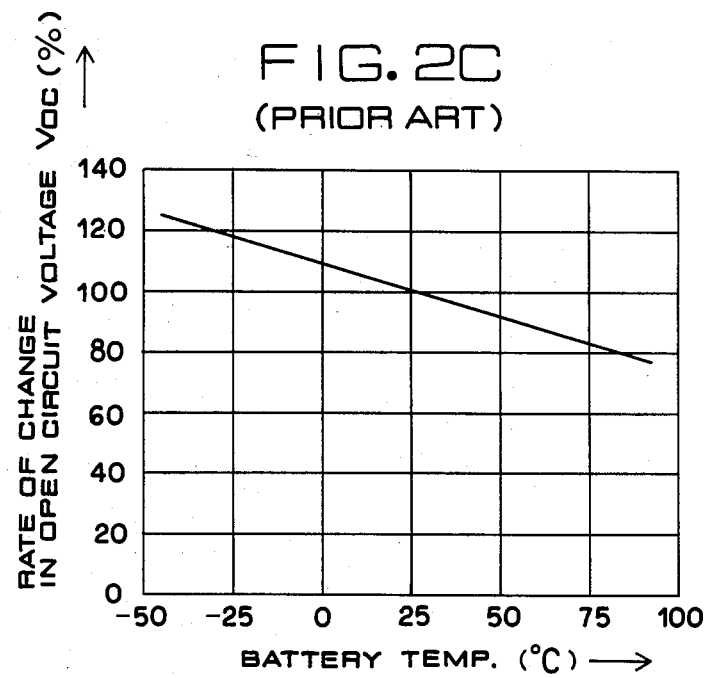
FIG. 2C is a graph showing open circuit voltage-battery temperature characteristics in FIG. 1.

Then, operation of the preferred embodiment will be described below with reference to FIG. 3. The short-circuit 7a is intermittently closed in the short-circuit detection unit 7, and at this time, a short-circuit current of the solar battery 3 from the current transformer 7b is detected by the short-circuit detector 7c. Then, a quantity of light to be received is anticipated from the short-circuit current by the current conversion unit 7d, and a current command signal is produced. On the other hand, the open circuit voltage of the solar battery 3 is intermittently detected by the temperature compensation unit 10 in the following manner during the period except during the time the short-circuit switch 7a is closed. That is to say, first the switch 10d is intermittently opened as shown in FIG. 4, and at this time, the main circuit 2 on the load side is electrically disconnected from the solar battery 3. In association with such an opening operation of the switch 10d, the detection switch 10f is closed as shown in FIG. 4, and the solar battery 3 is connected to the voltage detector 10a under the closed circuit condition thereof. As the voltage detector 10a is a detector having a very high impedance, the open voltage Voc of the solar battery 3 is detected under the condition where substantially no current of the solar battery 3 flows. As shown in FIG. 2C, a cell temperature as converted from the detected open circuit voltage according to the characteristics between a rate of change in the open circuit voltage and the temperature of the solar battery 3 is determined and held by the converter 10b. Then, a compensation value of the current command signal is computed from the cell temperature, and a current command signal supplied from the short-circuit current detection unit 7 to the compensation unit 10c is compensated in the unit 10c. On the other hand, a load current is normally detected by the load current detector 8b via the current transformer 8a, and a load current signal is supplied from the load current detection unit 8. Then, the load current signal is computed by the operating unit 9 so as to be optimum for an output current of the solar battery 3, and a speed command signal for the electric motor 1 is supplied to the control circuit 4 according to the current command signal as previously compensated. A switching element included in the main circuit 2 is on-off controlled according to the speed command signal by the control circuit 4.

Accordingly, the electric motor 1 may be operated at variable speeds without loss with an output corresponding to a quantity of light to be received by the solar battery 3, and may be run with a high efficiency.

Although a variable speed electric motor is used as the electric motor 1 in the preferred embodiment, a DC brushless motor and the like may be substituted therefor, which may exhibit an effect similar to that in the preferred embodiment. Further, although a mechanical contact point is employed as the short-circuit switch 7a as shown in the drawing, any other switching means capable of effecting a switching operation may be used, wherein an effect similar to that in the preferred embodiment may be exhibited. Further, in the preferred embodiment, the current transformer 8a is provided in a power supply line from the solar battery 3 to the main circuit 2 to detect a direct current for purpose of detection of a load current. However, it is of course permitted to provide the current transformer 8a in a line from the main circuit 2 to the electric motor 1 to detect an alternating current. Additionally, although the temperature compensation unit 10 in the preferred embodiment is of a type such that a temperature compensation value according to an open circuit voltage is held, it is permitted to provide a memory circuit for storing an open circuit voltage value and the like.

As is above described, according to the present invention, a quantity of light received is determined from a short-circuit current of the solar battery to generate a current command signal which is optimum for driving the electric motor. Further, a cell temperature is determined from an open circuit voltage of the solar battery to compensate the current command signal with a high accuracy. As a result, it is possible to control the rotational speed of the electric motor which is optimum for an output current of the solar battery, and operate the electric motor without loss with a high efficiency, thus providing a remarkably improved control device for a variable speed electric motor.

What is claimed is:

1. A control device for a variable speed electric motor comprising:

a control circuit for supplying a speed command signal to a variable speed electric motor adapted to be driven by a solar battery;

a short-circuit switch connected in parallel to said solar battery;

a current transformer for detecting a short-circuit current of said solar battery adapted to flow upon closing of said short-circuit switch;

a current conversion unit for determining a quantity of light received by said solar battery from said short-circuit current as detected by said current transformer, and generating a predetermined current command signal according to said quantity of light to be received;

a voltage detector connected in parallel to said solar battery for detecting an open circuit voltage of said solar battery;

a converter for converting a temperature of said solar battery according to said open circuit voltage as detected by said voltage detector;

a compensator for compensating said current command signal according to said temperature;

a load current detection unit for detecting a load current to said variable speed electric motor and generating a load current signal; and an operating unit for supplying a speed command signal to said control circuit according to said current command signal as compensated and said load current signal.

2. The control device as defined in claim 1, wherein said short-circuit switch connected in parallel to said solar battery is adapted to be intermittently closed to detect a short-circuit current.

3. The control device as defined in claim 1, wherein said voltage detector is a high impedance detector intermittently connected in parallel to said solar battery, and is adapted to detect an open circuit voltage of said solar battery by closing a detection switch connected to said detector in series.

4. The control device as defined in claim 3, wherein said voltage detector is adapted to detect said open circuit voltage by closing said detection switch during an opening period of a second switch for intermittently releasing a load.

* * * * *